(12) United States Patent
Bode et al.

(10) Patent No.: US 6,812,749 B2
(45) Date of Patent: Nov. 2, 2004

(54) CONTROL CIRCUIT FOR CURRENT CONVERTER VALVES

(75) Inventors: Rüdiger Bode, Adelsdorf/Neuhaus (DE); Günther Katzenberger, Würzburg (DE)

(73) Assignee: Semikron Elektronik GmbH, Nuremburg (DE)

( * ) Notice: Subject to any disclaimer, the term of this patent is extended or adjusted under 35 U.S.C. 154(b) by 125 days.

(21) Appl. No.: 10/365,980

(22) Filed: Feb. 13, 2003

(65) Prior Publication Data

US 2003/0151932 A1 Aug. 14, 2003

(30) Foreign Application Priority Data

Feb. 13, 2002 (DE) ......................... 102 05 832

(51) Int. Cl.$^7$ ............................... H03B 1/00
(52) U.S. Cl. .................................... 327/109
(58) Field of Search ................. 327/103, 108, 327/109, 588

(56) References Cited

U.S. PATENT DOCUMENTS 5,202,830 A * 4/1993 Tsurumiya et al. ........... 701/41

OTHER PUBLICATIONS

Article: IEEE Approves Amendment to IEEE 1394 Standard for High–Speed Serial Buses Allowing Gigabit Signaling, http://www.standards.ieee.org/announcements/1394ban-n.html, printed Jan. 23, 2003, © 2002 IEEE, pp. 1–2.
Semikron's Applications for IGBT and MOSFET modules, pp. 190–197, ISBN 3–932633–24–5, first edition.

* cited by examiner

Primary Examiner—Jeffrey Zweizig
(74) Attorney, Agent, or Firm—Andrew F. Young, P.C.

(57) ABSTRACT

A control circuit for current converter valves includes at a user-specific request unit, a digital transmission unit, and at least one interchangeable system-specific control unit. The control unit includes at least one control circuit with a digital interface, a digital processor and analog components for directly controlling the at least one current converter valve.

11 Claims, 3 Drawing Sheets

CONTROL CIRCUIT FOR CURRENT CONVERTER VALVES

This application claims the priority benefit of DE 102 05 832.6, filed Feb. 13, 2002, the contents of which are incorporated herein by reference.

BACKGROUND OF THE INVENTION

1. Field of the Invention

The present invention relates to a control circuit for current converter valves. More specifically, the present invention relates to a control circuit including at least a request unit having at least one digital processor, a digital transmission unit, and a control unit. The control unit includes at least one digital interface, a control circuit, a digital processor and analog components for directly controlling the at least one current converter valve.

2. Description of the Related Art

The invention relates to a control circuit for current converter valves of a type used, for example, in several classes of current converters. Examples of related types of control circuits are shown in "Application Handbook IGBT and MOSFET power modules" by U. Nicolai, ISBN 30932633-24-5, pages 192 to 196.

Commonly, control circuits for known current converters consist of a "user-specific" request unit and a "system-specific" control unit for the power semiconductor module.

"User-specific" request units are those units individually designed for a specific application range of current converter valves or current converters. "System-specific" control units are those control units individually designed for, or as a component of, the current converter valves or valve elements, such as current converters in the form of power semiconductor modules.

Referring now to FIG. 1, a control circuit 1 for a current converter 36 employing current converter valves 37 includes a request unit 10 and a control unit 30 joined by a conventional multi-wire cable 20. This type of conventional current converter 36 consists of one or more power semiconductor modules (not shown). In this case, a three-phase current converter is used to drive 40 (as shown in a motor 40 as will be described).

Request unit 10 includes a digital processor 11, and a downstream analog signal processor or signal generator 12 which generates analog control signals for the three TOP and three BOT switches (not shown) of conventional current converter 36 (described later). These control signals are then applied as 0/15 V analog values to an interface 13 as an output signal.

Multi-wire cable 20 transmits the output signals as continuous analog values from request unit 10 to control unit 30, in a point-to-point connection.

An analog interface 31, in control unit 30, receives the continuous analog values from interface 13 and continually transmits them directly to analog components 35 for the direct control of current converter valves 37 of current converter 36. In this manner, control unit 30 controls a drive in the form of motor 40.

Unfortunately, to control the current converter valves 37 in current converter 36, each valve must remain switched on for as long as the corresponding output signal is applied, and consequently the control signal for each of the six (6) current converter valves must be continuously applied to a contact in interface 13.

Conventionally, interface 13 of request unit 10 also receives at least one analog input signal. Conventionally, analog input signals include the following:

temperature monitoring of the current converter valves
over-current monitoring of the current converter valves
current output of the corresponding half-bridge
voltage of the intermediate circuit.

Conventionally, control unit 30 functions by relaying the multiple analog control signals generated by request unit 10 to the drivers of current converter valves 37. Additionally, control unit 30 attempts to serve multiple protective functions, including spike suppression and short-circuit recognition. Finally, control unit 30 attempts to report errors and individual measured values such as temperature or current output as analog signals back to request unit 10 providing a rudimentary feed back.

As noted above, the user-specific request circuit 10 generates systemspecific analog control signals, i.e. control signals at the time and for the duration when current converter valves 37 are intended to be switched on. These control signals are relayed as a continuous analog signal to control unit 30. Consequently, the analog signals generated by request unit 10 control current converter valves 37 directly.

One disadvantage of the conventional design is that it is possible to unintentionally interrupt the continuous data transmission between request unit 10 and control unit 30 (see below). Where interruption occurs, not all of the input signals in request unit 10 can be correctly evaluated and converted into the appropriately altered control pulses sent to control unit 30 and control circuit 1 cannot function.

Another disadvantage of the conventional art is that since request unit 10 must generate "system-specific" signals, request unit 10 must be adapted to the new "system-specific" control signals whenever current converter 36 is changed or modified. This need often arises when a new generation of current converters 36 is introduced by a manufacturer. Further, depending upon the new generation of current converter 36 used, it may be necessary to additionally reconfiguration of signals sent to request unit 10 and require the re-adaptation of the "user-specific" request unit to the "system-specific" signals.

As noted above, request unit 30 contains analog interface 31 for continuous communication with request unit 10. Analog interface 31 receives the analog control signals from request unit 10 and continuously transmits the above mentioned feedback signals, such as temperature monitoring signals for current converter valves 37, over-current monitoring for current converter valves 37, or current output of the corresponding half-bridge and voltage of the intermediate circuit.

For feedback purposes, either control unit 30 or current converter 36 include the requisite conventional sensors (not shown). Based on values from these sensors, control unit 30, which also includes internal protective functions (not shown) for current converter valves 37, can for example, turn current converter 36 off and prevent destruction from over heating.

Unfortunately, due to the conventional design, for internal protective functions the only basic data that can be evaluated are the own sensor values and the control signals presently applied by the request unit 10. Due to the lack of values for the future control of the current converter valves 37, a preventive protective function is possible only to an extremely limited extent.

As a further difficulty of the present design, since each conventional user-specific request unit 10 generates its own control pulses, conventional system-specific control unit 30 is also unable to recognize principal or systematic false controls of request unit 10, since only an instantaneous value is available in each case, and the future control pulses cannot be electrically predicted. Consequently, current converter 36 cannot be completely protected by the system-specific control unit 30 against malfunctions of the user-specific request unit 10. There is also no assurance in the conventional control circuit 1 that all error messages to user-specific request unit 10 were evaluated correctly by that unit and converted into appropriately changed control pulses.

It is also possible that conventional control circuit 1 can pick up interference (recognized as signals), or specific transmitted signals containing incident interference which may not be recognized as such. Consequently, conventional control circuit 1 fails to prevent a danger of undesirable control of current converter 36 with the associated risk of malfunction or failure.

As noted above, all signals between request unit 10 and control unit 30 are transmitted as continuous analog values via conventional multi-wire cable 20 designed as a point-to-point connection. Since the control signal of each current converter valve 37 requires its own load, i.e. six wires are necessary in total, since the control signal must be applied for as long as current converter valves 37 are to remain switched on.

As noted above, the wires of multi-wire cable 20 are also necessary for the temperature monitoring current converter valves 37, the over-current monitoring of current converter valves 37, the current output of the corresponding 3-phase half-bridge (3 wires)(not shown) and the voltage of the intermediate circuit. Thus, multi-wire transmission cable 20 must have a large number of wires to be able to transmit all the desired analog signals.

Technologically, such multi-wire cables 20 (also called transmission lines) measure one meter in length only if the distances is short. As the distance increases, the known disadvantages of analog signal transmission over length become detrimentally evident. Specifically, when current converters 36 are used under rough environmental conditions, for example in wind turbines, analog signal transmission over length proves to be a particular disadvantage.

As also touched on above, another disadvantage of analog transmission by multi-wire cable 20 is that the signals lack immunity against electrical interference. Further, rogue electrical signals, introduced by incident electrical interference not easily detected or recognized and allow little convenient correction of transmission error. In sum, there is a danger of undesirable control of current converter 36 with the additional risk that this will cause current converter 36 to malfunction.

In total, the disadvantages of the conventional technology shown in control circuit 1 are such that the functional safety, and thus the operational availability of current converters 36 is limited.

Referring now to FIG. 2, an alternative conventional control circuit 1A for multiple control units 30 (each including current converters 36 (not shown)) requires that conventional request unit 10 be adapted to additionally include the number of multiple interfaces 13 and multiple multi-wire cables 20 necessary for the number of extra current converters 36.

Referring now to FIG. 3, a further alternative conventional control circuit 1B, includes at least one additional adaptor 21 which relays control signals from a single interface 13 to designated multiple control units 30 and current converters 36 (not shown) by multiple analog multi-wire cables 21. In control circuit 1B, instead of controlling only one current converter 36, control circuit 1B requires an adapted circuit arrangement request unit 10 as well, necessitating further adaptation.

In either control circuit 1A, 1B, the expansion of the control circuit to several control units 30 and current converters 36, is called scalability and is achieved only at economically detrimental expense. Consequently, the requirement of additional analog control lines with each of the above-named drawbacks must be regarded as main disadvantages to the conventional design.

OBJECTS AND SUMMARY OF THE INVENTION

An object of the present invention is to provide a control circuit for control units controlling current converter valves, which overcomes the drawbacks as noted above.

Another object of the present invention is to provide a control circuit for current converter valves, or control units containing the same, which is immune to interference and can recognize errors.

Another object of the present invention is to provide a control circuit for current converter valves, or control units containing the same, which requires a request unit that is less complex, expensive, and easier to manufacture.

Another object of the present invention is to provide a control circuit for current converter valves, or control units containing the same, which is easily and economically adaptable and scalable to various customer requests.

Another object of the present invention is to provide a control circuit for current converter valves, or control units containing the same, in which the request unit only transmits the parameters for controlling the current converters, in which the corresponding analog signals for controlling the current converter valves are generated solely in the respective control units, and that these parameters are transmitted by way or means of a suitable digital data processor which is immune to interference and can at least recognize errors.

The present invention relates to a control circuit for a current converter, comprising: at least one request unit; at least a first digital processor and at least a first digital interface in said request unit; at least one control unit; at least a second digital processor and at least a second digital interface in said control unit; at least one analog processor in said control unit in controlling communication with said current converter; and at least one digital transmission unit operably connecting said at least one request unit to said at least one control unit, whereby data transmissions between said request unit and said control unit are operably effective during a use to provide an error free circuit control for said current converter.

According to another embodiment of the present invention there is provided a control circuit for a current converter, further comprising: a first digital interface control circuit in the first digital interface, and a second digital interface control circuit in the second digital interface, whereby the control circuit minimizes circuit errors between the request unit and the control unit.

According to another embodiment of the present invention there is provided a control circuit for a current converter, wherein: the digital transmission unit includes a cable-based transmission pathway between the request unit and the at least one control unit, and the cable-based transmission pathway includes at least one of an electrical and an optical transmission pathway.

According to another embodiment of the present invention there is provided a control circuit for a current converter, wherein: the digital transmission unit includes a free-space-based transmission pathway between the request unit and the at least one control unit, and the free-space-based transmission pathway includes at least one of a radio frequency and an infra-red frequency pathway.

According to another embodiment of the present invention there is provided a control circuit for a current converter, wherein: the digital transmission unit matches the requirements of international standard IEEE 1394.

According to another embodiment of the present invention there is provided a control circuit for a current converter, wherein: the current converter operably controls a plurality of current converter valves, whereby the control circuit operably controls the plurality of current converter valves during a use with an increased reliability.

The present invention further relates to a control circuit for a plurality of current converters, comprising: at least one request unit, at least a first digital processor and at least a first digital interface in the request unit, a plurality of control units operably interconnected in a series, each the control unit in operable control of at least one of the plurality of current converters, at least a second digital processor and at least a second digital interface in each the control unit, at least one analog processor in each the control unit in controlling communication with respective ones of the plurality of current converters, and at least one digital transmission unit operably connecting the at least one request unit to at least a first of the plurality of control units, whereby data transmissions between the request unit and the first of the plurality of control units are operably effective during a use to provide an error free control circuit between the plurality of current converters and the request unit.

According to another embodiment of the present invention there is provided a control circuit for a plurality of current converters, further comprising: a first digital interface control circuit in the first digital interface, and a second digital interface control circuit in each the second digital interface, whereby the control circuit minimizes circuit errors between the request unit and each the control unit.

According to another embodiment of the present invention there is provided a control circuit for a plurality of current converters, wherein: the digital transmission unit includes a cable-based transmission pathway between the request unit and the at least first of the plurality of control units, and the cable-based transmission pathway includes at least one of an electrical and an optical transmission pathway.

According to another embodiment of the present invention there is provided a control circuit for a plurality of current converters, wherein: the digital transmission unit includes a free-space-based transmission pathway between the request unit and the at least first of the plurality of control units, and the free-space-based transmission pathway includes at least one of a radio frequency and an infra-red frequency pathway.

According to another embodiment of the present invention there is provided a control circuit for a plurality of current converters, wherein: said digital transmission unit matches the requirements of international standard IEEE 1394.

The above, and other objects, features and advantages of the present invention will become apparent from the following description read in conduction with the accompanying drawings, in which like reference numerals designate the same elements.

DETAILED DESCRIPTION OF THE PREFERRED EMBODIMENTS

Figure 1:
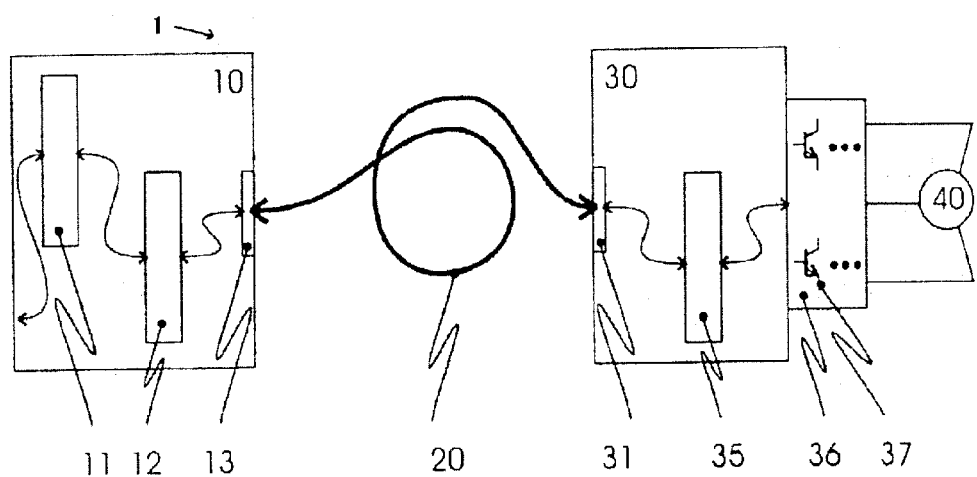
FIG. 1 is a schematic view of a conventional analog control circuit for a single control unit.
Figure 2:
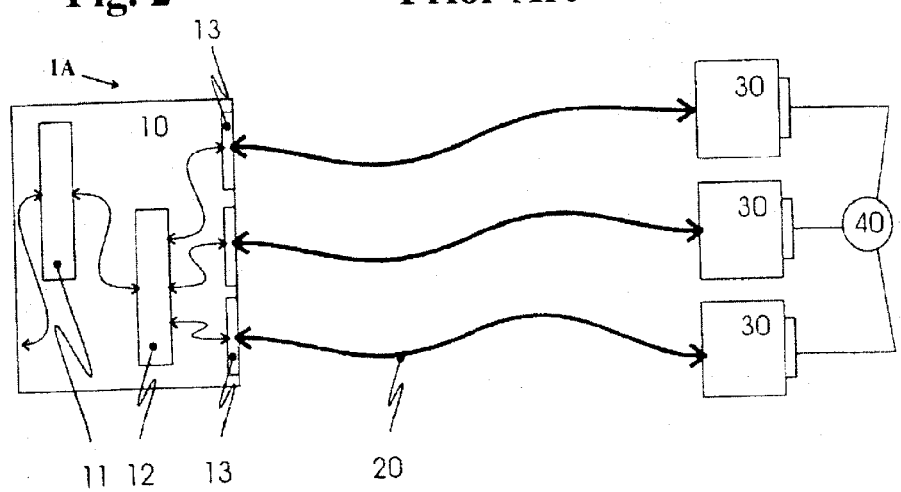
FIG. 2 is schematic view of a conventional control circuit for multiple control units.
Figure 3:
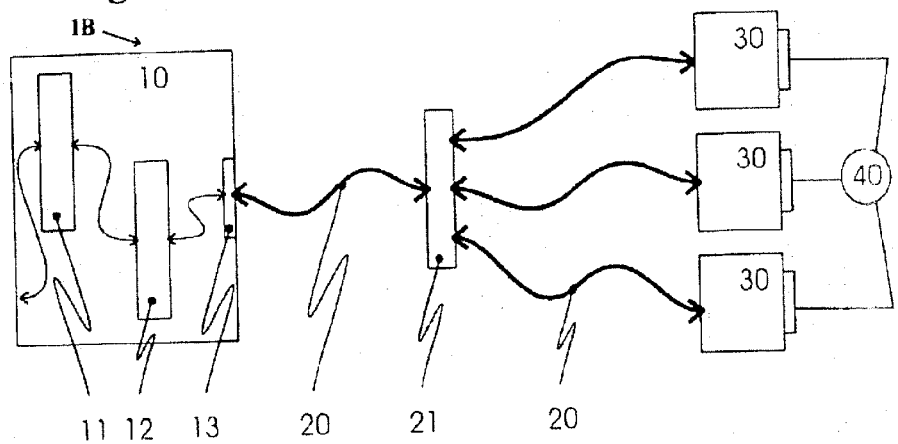
FIG. 3 is a schematic view of another conventional control circuit for multiple control units.
Figure 4:
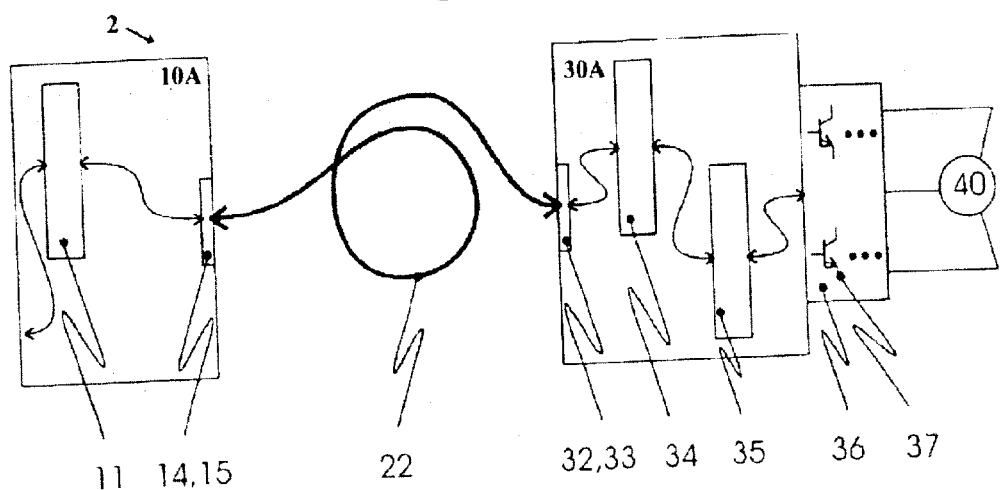
FIG. 4 is a schematic view of a control circuit according to one embodiment of the present invention.

Referring now to FIG. 3, a control circuit 2 of a current converter 36 (here in 3-phase) for controlling a 3-phase motor 40 (a 3-phase drive) includes a request unit 10A, a control unit 30A, and a digital transmission unit 22.

Request unit 10A includes components minimally necessary for controlling current converter valves 37. Request unit 10A includes a digital processor 11 in communication with a digital interface 14 and a control circuit 15. Request unit 10A contains no analog signal processing for controlling current converter valves 37 in control unit 30A.

Digital processor 11 receives input (feedback) response signals exclusively standardized by control unit 30A via digital interface 14 going to current converter 36 or its control unit 30A, as will be explained. From these input signals, as well as from user-specific data, digital output signals are generated which are transmitted by digital interface 14 to control unit 30A at the request of control unit 30A. The data transmitted by these input signals contains the selected control parameters of current converter valves 37 in standardized digital form.

Request unit 10A also receives all necessary operating parameters for current converter 36 in standardized digital form to generate the accurate output signals necessary for the desired operating mode.

As a consequence of the standardized digital form of the data exchange, the user-specific request unit 10A does not need any system-specific information about the internal control parameters of current converter 36

Control unit 30A consists of at least one digital interface 32 having a linked control circuit 33, a digital processor 34, and the necessary analog components 35 for direct control of current converter 36 and current converter valves 37.

In the present embodiment, digital processor 34 receives the control parameters of current converter 36 as digital input signals from request unit 10A. Digital processor 34 also evaluates the sensor values of the various operating parameters of current converter 36.

From both data streams (control parameters and sensor values), processor 34 generates control signals for analogue driver components 35 and current converter valves 37 in current converter 36. Consequently, current converter 36 is controlled completely by the system-specific component, namely control unit 30A, and not (as occurs conventionally) by both control unit 30 and request unit 10. In this context, complete control is defined such that control unit 30A exercises control of current converter valves 37 as requested by request unit 10A provided that no feed back parameters (sensor values), such as the temperature of current converter valves 37, counter-indicate and prevent such control. Should the sensor values indicate, for example excess temperature for current converter valves 37, control unit 30A will implement a correspondingly different control signal.

In the present embodiments discussed, data transmission is in series according to international standard IEEE 1394, which allows for electrical as well as optical cable-based transmission paths in digital transmission unit 22, between request unit 10A and control unit 30A.

A primary benefit of such electrical and optical digital transmission is that such data transmission allows for easy error recognition and error correction by either one of control circuits 15, 33 and digital processor 34. Alternatively, other digital-capable cable-based systems or free-space systems for the digital transmission unit 22 may be used, including radio signal systems and optical signal systems.

The present embodiments of the invention, incorporating data transmission methods according to IEEE 1394 provides a further benefit by allowing for easy networking of several components.

Figure 5:
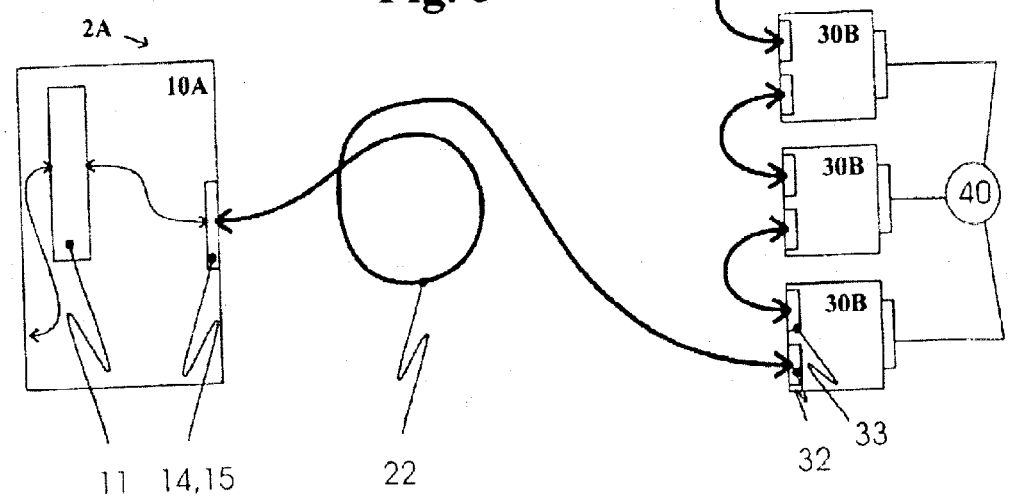
FIG. 5 is a schematic view of a control circuit for multiple control units according to another embodiment of the present invention.

Referring now to FIG. 5, using digital transmission unit 22, and the above-described individual inventive embodiment, it is possible to connect request unit 10A with a plurality of control units 30B in a control circuit 2A series without having to change the configuration of the individual control unit's 10A circuit. In this embodiment, it is only necessary to provide individual control units 30B with two digital interfaces 32 and a joint or individual control circuit 33, to enable a typical network structure. This is an easy method of making the present inventive control circuit system scalable. In this manner, an expanded and accurate control circuit 2A may extend operable control from individual request unit 10A to multiple and interchangeable control units 30B, while at the same time allowing for easy replacement of failed control units 30B.

One benefit of the present control circuit 2, 2A, incorporating the elements noted above, is that the reliability and operational availability of current converter 36 is increased. It should be understood, that current converter 36 may include any number of specific current converter valves 37 or other current controllers depending upon the requirements of the drive or motor 40 selected by the end user. The present invention is shown with a 3-phase motor 40 in illustration, but other drives requiring operation by alternative current converters 36 may be used. The above-benefit occurs since critical operating conditions can be accurately detected and managed, and the system-specific controls (found in control units 30A, 30B) can take appropriate corrective measures without interference from signals from the user-specific request unit 10A making unforeseen requests.

Another benefit of the present invention is that critical operating conditions and limits can be stored in control circuits 15, 33, or in a memory (not shown), and can therefore be subsequently evaluated. This memory can be stored in either or both of request unit 10A and control unit 30A, or in a removable medium operably connectable with both.

As another benefit of the present invention, and due to the configuration of data transmission (as described above), transmission errors are either promptly corrected, or at least recognized, by digital processor 34 or control circuits 15, 33 and cannot lead to unforeseen and unacceptable switching states for current converter 36 and thus to its operational failure.

Consequently, the entire inventive control circuits 2, 2A for power semiconductor modules offers substantial advantages in comparison with the conventional arts:

Increased functional safety by providing interference-immunity for data processing, such limiting the generation of analog signals to the system-specific respective control units 30A, 30B.

Simpler configuration of the user-specific request unit 10A, which now only has to process standardized signals from control circuits 2, 2A and only has to generate such basic signals for single or multiple respective control units 30A, 30B, eliminating the need to customize each request unit to a specific system-specific control unit.

Error-tolerant and interference-proof digital data processing between the request unit 10A and the respective control units 30A, 30B.

Possible complete galvanic separation between request unit 10A and respective control units 30A, 30B.

Easy and economic scalability and interchangeability without adaptation requiring additional relays, and consequently simple upgradability and adaptability as required by an end user.

In the claims, means- or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood by those skilled in the art that the invention is not limited to those precise embodiments, and that various changes, modifications, and adaptations may be effected therein by one skilled in the art without departing from the novel teachings, scope, advantages, or spirit of the invention as defined in the appended claims.

What is claimed is:

1. A control circuit for a current converter, comprising:
   at least one request unit;
   at least a first digital processor and at least a first digital interface in said request unit;
   at least one control unit;
   at least a second digital processor and at least a second digital interface in said control unit;
   at least one analog processor in said control unit in controlling communication with said current converter; and
   at least one digital transmission unit operably connecting said at least one request unit to said at least one control unit, whereby data transmissions between said request unit and said control unit are operably effective during a use to provide an error free circuit control for said current converter.

2. A control circuit for a current converter, according to claim 1, further comprising:
   a first digital interface control circuit in said first digital interface; and
   a second digital interface control circuit in said second digital interface, whereby said control circuit minimizes circuit errors between said request unit and said control unit.

3. A control circuit for a current converter, according to claim 2, wherein:
   said digital transmission unit includes a cable-based transmission pathway between said request unit and said at least one control unit; and said cable-based transmission pathway includes at least one of an electrical and an optical transmission pathway.

4. A control circuit for a current converter, according to claim 2, wherein:

said digital transmission unit includes a free-space-based transmission pathway between said request unit and said at least one control unit; and said free-space-based transmission pathway includes at least one of a radio frequency and an infra-red frequency pathway.

5. A control circuit for a current converter, according to claim 2, wherein:

said digital transmission unit matches the requirements of international standard IEEE 1394.

6. A control circuit for a current converter, according to claim 2, wherein:

said current converter operably controls a plurality of current converter valves, whereby said control circuit operably controls said plurality of current converter valves during a use with an increased reliability.

7. A control circuit for a plurality of current converters, comprising:

at least one request unit;

at least a first digital processor and at least a first digital interface in said request unit;

a plurality of control units operably interconnected in a series;

each said control unit in operable control of at least one of said plurality of current converters;

at least a second digital processor and at least a second digital interface in each said control unit;

at least one analog processor in each said control unit in controlling communication with respective ones of said plurality of current converters; and at least one digital transmission unit operably connecting said at least one request unit to at least a first of said plurality of control units, whereby data transmissions between said request unit and said first of said plurality of control units are operably effective during a use to provide an error free control circuit between said plurality of current converters and said request unit.

8. A control circuit for a plurality of current converters, according to claim 7, further comprising:

a first digital interface control circuit in said first digital interface; and a second digital interface control circuit in each said second digital interface, whereby said control circuit minimizes circuit errors between said request unit and each said control unit.

9. A control circuit for a plurality of current converters, according to claim 8, wherein:

said digital transmission unit includes a cable-based transmission pathway between said request unit and said at least first of said plurality of control units; and said cable-based transmission pathway includes at least one of an electrical and an optical transmission pathway.

10. A control circuit for a plurality of current converters, according to claim 8, wherein:

said digital transmission unit includes a free-space-based transmission pathway between said request unit and said at least first of said plurality of control units; and said free-space-based transmission pathway includes at least one of a radio frequency and an infra-red frequency pathway.

11. A control circuit for a plurality of current converters, according to claim 8, wherein:

said digital transmission unit matches the requirements of international standard IEEE 1394.

\* \* \* \* \*